United States Patent
Wine et al.

(10) Patent No.: US 9,378,607 B1
(45) Date of Patent: Jun. 28, 2016

(54) DYNAMIC PRODUCT PRESENTATION SYSTEM AND COMMERCE PLATFORM

(71) Applicant: IVP Holdings III LLC, Bellevue, WA (US)

(72) Inventors: David Wine, Seattle, WA (US); James A. Holt, Bellevue, WA (US); Edward K.Y. Jung, Bellevue, WA (US)

(73) Assignee: IVP Holdings III LLC, Bellevue, WA (US)

( * ) Notice: Subject to any disclaimer, the term of this patent is extended or adjusted under 35 U.S.C. 154(b) by 0 days.

(21) Appl. No.: 14/275,791

(22) Filed: May 12, 2014

Related U.S. Application Data (60) Provisional application No. 61/823,256, filed on May 14, 2013.

(51) Int. Cl.
| | |
|---|---|
| G06F 7/00 | (2006.01) |
| G07F 11/00 | (2006.01) |
| B65G 1/137 | (2006.01) |
| G07F 9/10 | (2006.01) |

(Continued)

(52) U.S. Cl.
CPC .............. *G07F 11/002* (2013.01); *A47F 10/02* (2013.01); *B65G 1/137* (2013.01); *B65G 1/1373* (2013.01); *B65G 1/1378* (2013.01); *E04H 3/04* (2013.01); *E04H 9/06* (2013.01); *G06Q 10/08* (2013.01); *G06Q 10/087* (2013.01); *G06Q 30/02* (2013.01); *G06Q 30/0201* (2013.01); *G06Q 30/0281* (2013.01); *G06Q 30/0282* (2013.01); *G07F 9/02* (2013.01); *G07F 9/105* (2013.01)

(58) Field of Classification Search
CPC ..... G06Q 10/087; G06Q 10/08; G06Q 20/20; G06Q 30/02; G06Q 30/06; G06Q 30/0601; G06Q 30/0641; G06Q 30/0282; G06Q 30/0201; G06Q 30/0281; B65G 1/1376; B65G 2209/08; B65G 1/1378; B65G 1/1373; G07F 17/16; G07F 17/0014; G07F 9/026; G07F 17/0092; G07F 11/002; G07F 11/62; G06F 19/3462; G11B 27/002; G11B 27/34; E04H 3/04; E04H 9/06; A47F 10/02
USPC ......... 705/26.1–29, 16, 22, 28; 700/213, 214, 700/216, 228, 231, 234, 236, 241–244; 186/36, 52

See application file for complete search history.

(56) References Cited

U.S. PATENT DOCUMENTS

| | | | | |
|---|---|---|---|---|
| 5,360,094 | A | * | 11/1994 | Adams .................. G07F 7/0636 186/60 |
| 5,385,265 | A | * | 1/1995 | Schlamp ........................... 221/7 |

(Continued)

*Primary Examiner* — Jeffrey Shapiro
(74) *Attorney, Agent, or Firm* — Ellen M. Bierman; Lowe Graham Jones PLLC (57) ABSTRACT

Methods, techniques, and systems for the live presentation of products and services to potential consumers in a manner that levels the playing field for suppliers/providers of different sizes, capabilities and with differing resources are provided. Examples provide a Dynamic Product Presentation System ("DPPS"), which enables suppliers and/or vendors to advertise and place new or replacement products before consumers according in a new commerce stream and enables potential consumers to interact on a personalized level with products including goods and/or services that may interest them before they buy them, to engage specialized services, return or exchange goods or other things, be presented with products and/or services that are automatically targeted to their buying habits and predicted needs, etc., all in the comfort of their own residence or location without the inconveniences of traditional shopping models or online environments.

20 Claims, 8 Drawing Sheets

(51) Int. Cl.
  *G06Q 10/08* (2012.01)
  *G06Q 30/02* (2012.01)
  *G07F 9/02* (2006.01)
  *A47F 10/02* (2006.01)
  *E04H 3/04* (2006.01)
  *E04H 9/06* (2006.01)

(56) References Cited

U.S. PATENT DOCUMENTS

| | | | | |
|---|---|---|---|---|
| 5,595,263 | A * | 1/1997 | Pignataro | B65G 1/1378 186/53 |
| 5,725,124 | A * | 3/1998 | Bustos | E04H 3/02 221/211 |
| 5,816,443 | A * | 10/1998 | Bustos | E04H 3/02 186/55 |
| 5,890,136 | A * | 3/1999 | Kipp | G06Q 10/087 186/55 |
| 6,048,086 | A * | 4/2000 | Valerino, Sr. | B01F 11/0005 514/474 |
| 6,457,038 | B1 * | 9/2002 | Defosse | G06Q 20/208 700/231 |
| 6,688,435 | B1 * | 2/2004 | Will et al. | 186/35 |
| 6,942,088 | B1 * | 9/2005 | Reiners | B62B 3/1404 104/172.2 |
| 7,020,680 | B2 * | 3/2006 | Defosse | B67D 1/0878 705/28 |
| 7,039,495 | B1 * | 5/2006 | Conboy | G05B 19/41865 700/213 |
| 7,381,022 | B1 * | 6/2008 | King | B65G 1/0492 187/270 |
| 7,523,182 | B2 * | 4/2009 | Godwin | G06Q 20/20 702/185 |
| 8,494,673 | B2 * | 7/2013 | Miranda | 700/213 |
| 8,690,510 | B1 * | 4/2014 | Razumov | B65G 1/0492 108/144.11 |
| 8,718,814 | B1 * | 5/2014 | Clark et al. | 700/214 |
| 8,720,742 | B2 * | 5/2014 | Zhang | G07F 5/18 221/120 |
| 8,734,079 | B1 * | 5/2014 | Razumov | B66F 9/07 198/347.4 |
| 8,854,195 | B2 * | 10/2014 | West | H04L 12/2859 340/286.01 |
| 9,230,387 | B2 * | 1/2016 | Stiernagle | G07F 9/023 |
| 2002/0032613 | A1 * | 3/2002 | Buettgenbach et al. | 705/26 |
| 2002/0165638 | A1 * | 11/2002 | Bancroft et al. | 700/213 |
| 2003/0165373 | A1 * | 9/2003 | Felder | B23Q 7/1442 414/331.07 |
| 2006/0192652 | A1 * | 8/2006 | Mandava et al. | 340/5.8 |
| 2007/0134078 | A1 * | 6/2007 | Rogers | H01L 21/67769 414/281 |
| 2007/0250326 | A1 * | 10/2007 | Kadaba | 705/1 |
| 2008/0025833 | A1 * | 1/2008 | Baker | B65G 1/1373 414/791.6 |
| 2008/0167884 | A1 * | 7/2008 | Mountz et al. | 705/1 |
| 2008/0181753 | A1 * | 7/2008 | Bastian | B65G 1/026 414/277 |
| 2008/0257957 | A1 * | 10/2008 | Steinecker | 235/380 |
| 2008/0281717 | A1 * | 11/2008 | Kortelainen | 705/26 |
| 2008/0294287 | A1 * | 11/2008 | Kawano | B25J 9/1664 700/252 |
| 2009/0149985 | A1 * | 6/2009 | Chirnomas | 700/215 |
| 2009/0212067 | A1 * | 8/2009 | Hales, Jr. | G06Q 30/02 221/282 |
| 2010/0138037 | A1 * | 6/2010 | Adelberg | G06Q 10/087 700/241 |
| 2010/0213027 | A1 * | 8/2010 | Co | G11C 29/56016 198/346.1 |
| 2010/0262282 | A1 * | 10/2010 | Segal | G06Q 30/02 700/241 |
| 2012/0029687 | A1 * | 2/2012 | Hagen | B65G 1/0407 700/218 |
| 2012/0029691 | A1 * | 2/2012 | Mockus | G06Q 20/18 700/232 |
| 2012/0078412 | A1 * | 3/2012 | Mockus | G07F 9/026 700/230 |
| 2012/0101627 | A1 * | 4/2012 | Lert | B65G 1/1378 700/216 |
| 2012/0116578 | A1 * | 5/2012 | Zhang | G07F 5/18 700/232 |
| 2012/0298688 | A1 * | 11/2012 | Stiernagle | G07F 9/023 221/155 |
| 2012/0303154 | A1 * | 11/2012 | Stiernagle | G07F 11/165 700/214 |
| 2013/0118094 | A1 * | 5/2013 | Laspia et al. | 52/79.1 |
| 2013/0123976 | A1 * | 5/2013 | McClure | G07F 9/023 700/237 |
| 2013/0233865 | A1 * | 9/2013 | Hutchinson et al. | 220/592.2 |
| 2013/0245810 | A1 * | 9/2013 | Sullivan et al. | 700/214 |
| 2014/0014470 | A1 * | 1/2014 | Razumov | B65G 1/0492 198/465.1 |
| 2014/0100769 | A1 * | 4/2014 | Wurman | G06Q 10/087 701/301 |
| 2015/0028157 | A1 * | 1/2015 | Hoogeveen et al. | 244/118.1 |
| 2015/0161841 | A1 * | 6/2015 | McClure | G07F 9/023 700/237 |

* cited by examiner

DYNAMIC PRODUCT PRESENTATION SYSTEM AND COMMERCE PLATFORM

TECHNICAL FIELD

The present disclosure relates to methods, techniques, and systems for product presentation and, in particular, to methods, techniques, and systems for dynamically presenting products and services in an automated fashion.

BACKGROUND

One of the difficulties with online shopping experiences is that they are virtual. You cannot go into a store and see, touch, and smell what you are trying to buy before you buy it. For some types of products, such as clothing and food, this virtual factor can be a strong impediment to the shopping experience. In addition, you must wait for a purchased item to be delivered—it isn't immediately available for your consumption or use.

On the other extreme, if you are willing to transport yourself to a store or other similar venue (e.g., a fair, open market, discount warehouse, and the like), you can see, touch, and smell what you are trying to buy and obtain it immediately. However, the inconvenience may be substantial. You may need to visit several stores which may be located some distance apart to find the exact item you are looking for. Further, in some geographic areas, stores with certain types of products may not be available at all.

In addition, from the supplier's standpoint, small businesses with limited real-estate and other limited resources may be at a disadvantage in traditional storefront shopping models. They may not be able to carry a large array of inventory or have the footprint to easily display it. They may not be able to afford targeted marketing campaigns or prices to compete with bigger companies. Thus, the mega-warehouses and discount facilities have an advantage when it comes to simply pushing large amounts and types of product at potential consumers.

Also, in both the online virtual and traditional physical shopping scenarios, it can be difficult to obtain a "try-before-you-buy" purchase experience. Some products and suppliers are amenable to this, but a majority are not, especially in the online or virtual shopping scenario. At most, you can purchase something and then return it, sometimes with a "money back guarantee." Some vendors even offer to pay return postage and pick up the merchandise to be returned the consumer still must arrange it.

Vending machines offer yet another type of point of purchase physical shopping opportunity. The vending machine is pre-stocked typically with a certain class of goods (e.g., drinks from a single vendor or distributor) or with goods of a pre-defined form factor and/or limited selection. Vending machines are typically located for convenience to purchasers, such as in other retail locations, hotels, businesses, transportation facilities, and the like. Returns are not really viable—you might be able to negotiate with the business at the location (e.g., building, hotel, store, event location, etc.) that hosts the vending machine, but you cannot return the good to the vending machine itself. There is no advertising of new products available—it is a "get what you see, when you see" sort of system.

DETAILED DESCRIPTION

Examples described herein provide methods, techniques, and systems for the live presentation of products and services to potential consumers in a manner that levels the playing field for suppliers/providers of different sizes, capabilities and with differing resources. Examples provide a Dynamic Product Presentation System ("DPPS"), which enables suppliers and/or vendors to advertise and place new or replacement products in front of consumers according to a new commerce stream and enables potential consumers to interact on a personalized level with products including goods and/or services that may interest them before they buy them ("try before you buy"). In addition, the DPPS enables potential consumers to engage specialized services, return or exchange goods or other things, be presented with products and/or services that are automatically targeted to their buying habits and predicted needs, try out new types of products, etc., all in the comfort of their own residence or location (e.g., dwelling, unit office, or other facility), without the aforementioned inconveniences of traditional shopping models or online environments. The DPPS provides a new commerce platform in which consumers can purchase, or try products and services, in the comfort of their own residences or other locations with the ability to see, touch, and smell without the inconvenience of transporting themselves to other locations. In addition, the new commerce platform enables suppliers to "push" goods and services (targeted to the consumer) without traditional advertising expenditures and without investing in storefronts and large physical footprints. Further, using DPPS components, product feedback, consumer preferences, usage and purchase history can be more accurately tracked, and subsequently more appropriately addressed by suppliers of goods. For example, riskier products can be tried out on real consumers and feedback solicited before engaging in potentially large mass production.

Using the DPPS, goods and services (hereinafter generally referred to as products) can be offered for sale, for trial, exchanged, returned, shared, auctioned, automatically restocked, etc. To accomplish this, the DPPS provides specialized cabinets that include a modular rack system for providing dynamically replaceable and configurable modules and an infrastructure for automatically servicing these cabinets on an ongoing basis. The cabinets effectively provide a "distributed storefront" and a distributed but larger footprint, which may be extremely cost effective and increase competitiveness for smaller vendors and suppliers of product. In one example DPPS, the infrastructure comprises a servicing channel (e.g., a service shaft), one or more robots for interacting with the cabinets and their modules, and a warehouse or other facility for storing and providing modules for the cabinets. The cabinets are populated with modules that contain various products (or representations of the same) and are accessed via the service shaft by the robots to place or remove items and/or modules. The modules may be of different sizes, provide different temperatures or other environmental controls, or have different appearances or uses. Suppliers can provide new products or exchange new ones for old ones, accept returns, and the like, by providing already packaged modules or by providing the products to be placed into an existing module by the infrastructure or by another third party. An example DPPS also includes a user interface to manage and/or personalize the layout of modules, including restricting placement according to defined rules, interact with the consumer regarding product feedback, signal changes to the cabinet, and the like.

In one example, DPPS is intended to be built into new construction where the cabinets and infrastructure can be designed and built into the consumer location such as a high-rise apartment building or office facility. In other examples, in limited circumstances, the DPPS may be able to be retrofit into an existing structure providing there is a way to build in access to a cabinet and the service channel to allow robots to manage the cabinets without human intervention. In other examples, some combination of human intervention and automated servicing may be possible.

Figure 1:
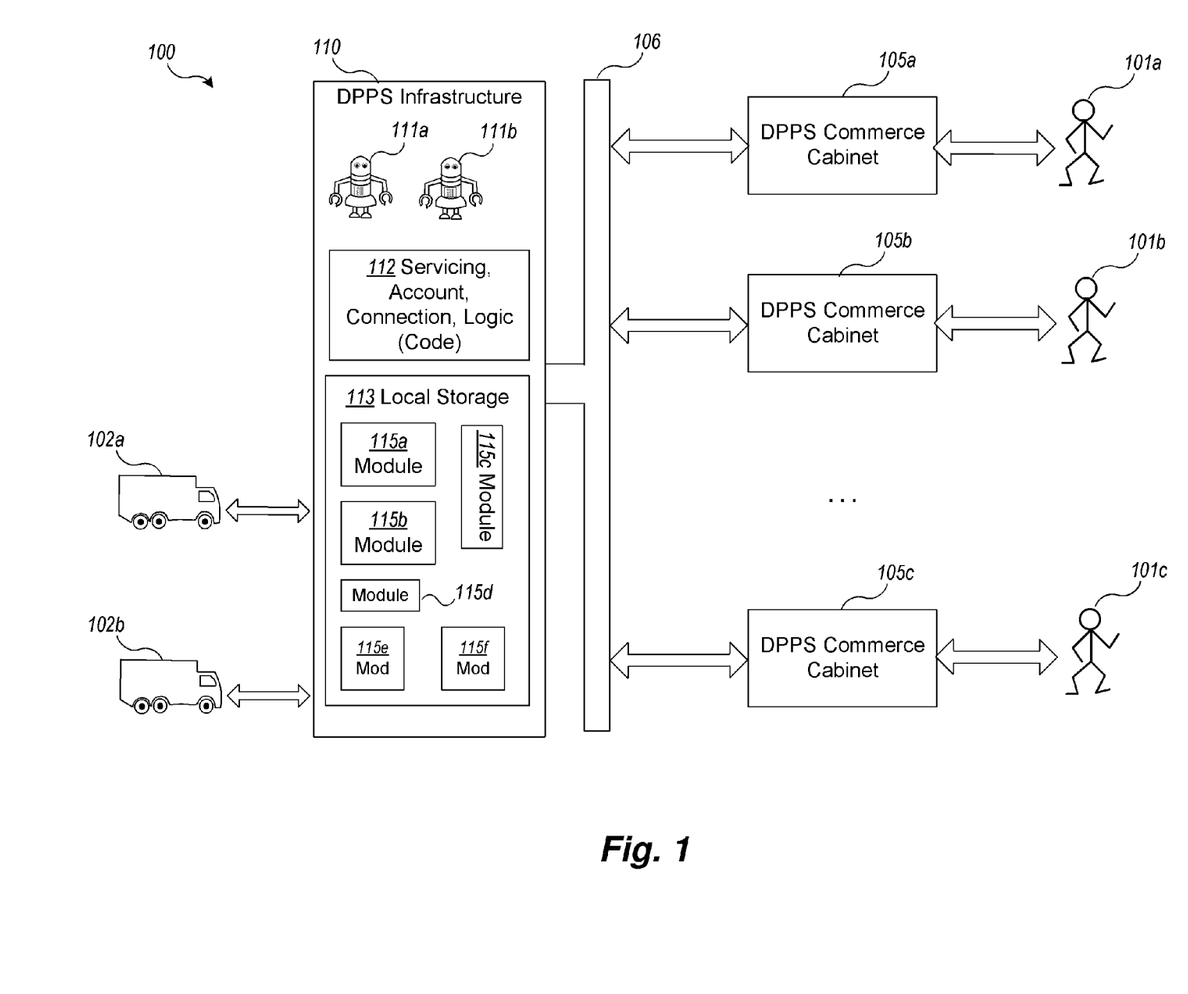
FIG. 1 is a block diagram of an example commerce platform supported by an example Dynamic Product Presentation System.

FIG. 1 is a block diagram of an example commerce platform supported by an example Dynamic Product Presentation System. In example DPPS deployments, the DPPS 100 comprises one or more functional components/modules that work together to provide the automated product placement and the localized and personalized shopping experience of the DPPS commerce platform. The DPPS commerce platform enables commerce between suppliers and consumers using DPPS 100. Each DPPS 100, for example, one installed in a residential complex or other outfitted location, comprises DPPS infrastructure 110, including a servicing channel 106, and one or more DPPS commerce cabinets 105a-105c. In typical installations a DPPS 100 is deployed in a residential complex such as a high-rise apartment or condominium building or a business complex such as a high rise building or hotel. Some degree of scale may be desirable to offset the costs for building or installing the infrastructure. In addition, incentives may be offered to building owners that provide DPPS deployments in their buildings. For the purpose of this description, the terms residence, resident location, or simply location will be used to mean any type of complex in which a DPPS can or may be deployed.

The DPPS infrastructure 110 comprises one or more robots 111a-111b or other mechanical or automated mechanisms for delivering products and/or modules; logic 112 (which may be in the form of code, instructions, programs, firmware, hardware or other form that can implement an algorithm) for providing servicing, purchasing and account management, connection support, data input and analytics, and/or DPPS infrastructure management such as module assembly and dispatching; and a local storage 113 that implements a local warehouse for storing and managing modules for commerce cabinets, for example, modules 115a-115f. The modules 115a-115f come in a variety of sizes and may provide different forms of environmental control such as hot and cold temperatures, controlled humidity, etc. for different products. It is intended that these modules may be assisted by control mechanisms in the commerce cabinets, for example, power supplied by a modular rack system in the cabinets, or by other means.

The servicing channel 106 may depend upon the design of the building that houses the DPPS 100. Minimally, it provides access to each commerce cabinet 105a-105c by the one or more transport vehicles, such as robots 111a-111b, to deliver modules to and pickup modules from the commerce cabinets 105a-105c. In some example DPPS environments, the servicing channel may be a "virtual" channel in that the robots 111a-111b utilize existing building structures (such as walls) to travel between the local storage 113 and the commerce cabinets 105a-105c.

The local storage area 113 services as a local warehouse for housing goods. The DPPS 100 uses local storage area 113 to aggregate, sort, and hold items for delivery and exchange. In preparation for a large rotation of product, many modules could be stored in advance so that they are immediately available when needed. Modules 115a-115f are dispatched from this area to the various resident locations via servicing channel 106. In addition, some of modules 115a-115f may temporarily be placed in the local storage area 113 before they are dispatched to other locations, such as back to suppliers/vendors, auction recipients, and the like. In such case, necessary environmental controls and power may need to be made available in the storage area 113. In some example DPPS 100 deployments, the area 113 is managing by intelligent logic (e.g., part of logic 112) that controls the arrangement of the modules, sorting, handling some amount of exchange locally (without returning the goods to a supplier), and the like.

As will be described in further detail below, each DPPS commerce cabinet, for example cabinets 105a-105c, resides in a "personalized" location. That is, in a typical deployment, each cabinet 105a-105c resides inside the residence of a consumer, and resembles a cabinet accessible to the consumer from one side and accessible to the automated system (e.g., autonomous delivery vehicles such as robots 111a-11b) from another side. Each cabinet 105a-105c contains its own infrastructure for communicating with users, such as potential consumers 101a-101c, for assisting in controlling the environment in the modules and for arranging them, for controlling access to the cabinet, and for servicing the modules. Part of the cabinet infrastructure is in the form of logic instructions (e.g., software code, machine instructions, firmware, hardware, or the like) for arranging modules, processing payments, managing user accounts, and communicating with the DPPS infrastructure.

In typical operation of a DPPS 100, suppliers deliver via transport mechanisms, for example trucks 102a-102b, products (not shown) that can be placed in front of potential consumers 101a-101c. These products either come prepackaged into modules (and sealed), for example, modules 115a-115f, or are placed into modules by another third party or the DPPS infrastructure 110. For example, in some instances third party intermediaries are used to package the modules taking into account factors such display tactics, color, layout, etc. Thus, a market in display and packaging techniques may arise to aid suppliers with presenting their goods in modules for commerce cabinets. The modules 115a-115f are then placed into local storage 113, to become deliverable to the commerce cabinets 105a-105c according to logic 112 and requests/instructions received from potential consumers 101a-101c.

For example, a supplier of home construction tools may contract with a building owner to put together a product module with six power tools on display for one month in every apartment. They might contract with a third party marketing group to lay out and design the module. There might be multiple versions of the module depending upon demographics. They may be assembled away from the eventual location, and delivered to the DPPS 100 in the owner's building on the last night of the month.

Figure 2A:
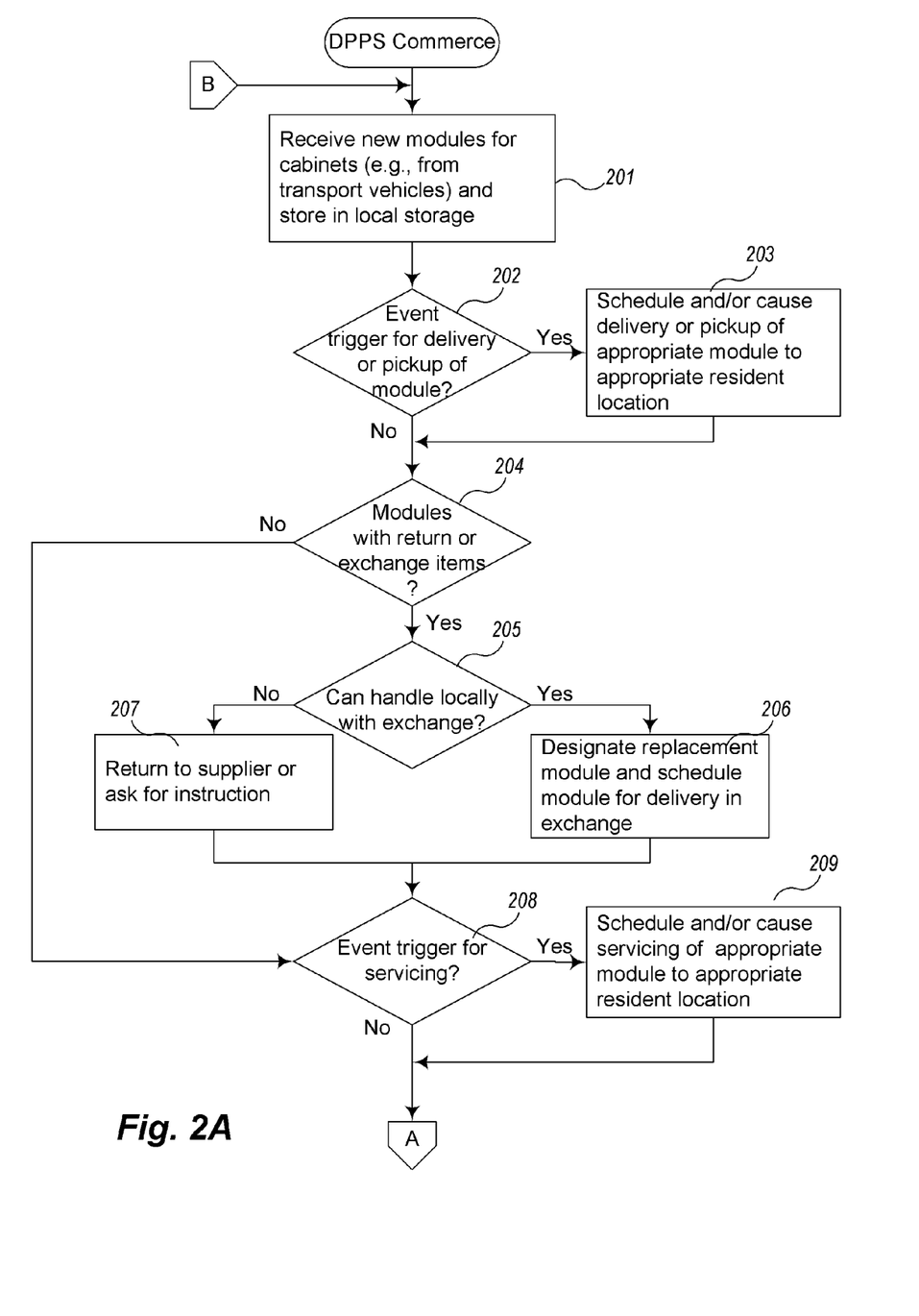
FIGS. 2A and 2B are an example block diagram of an overview of operations of an example DPPS infrastructure in an example DPPS to implement DPPS commerce.
Figure 2B:
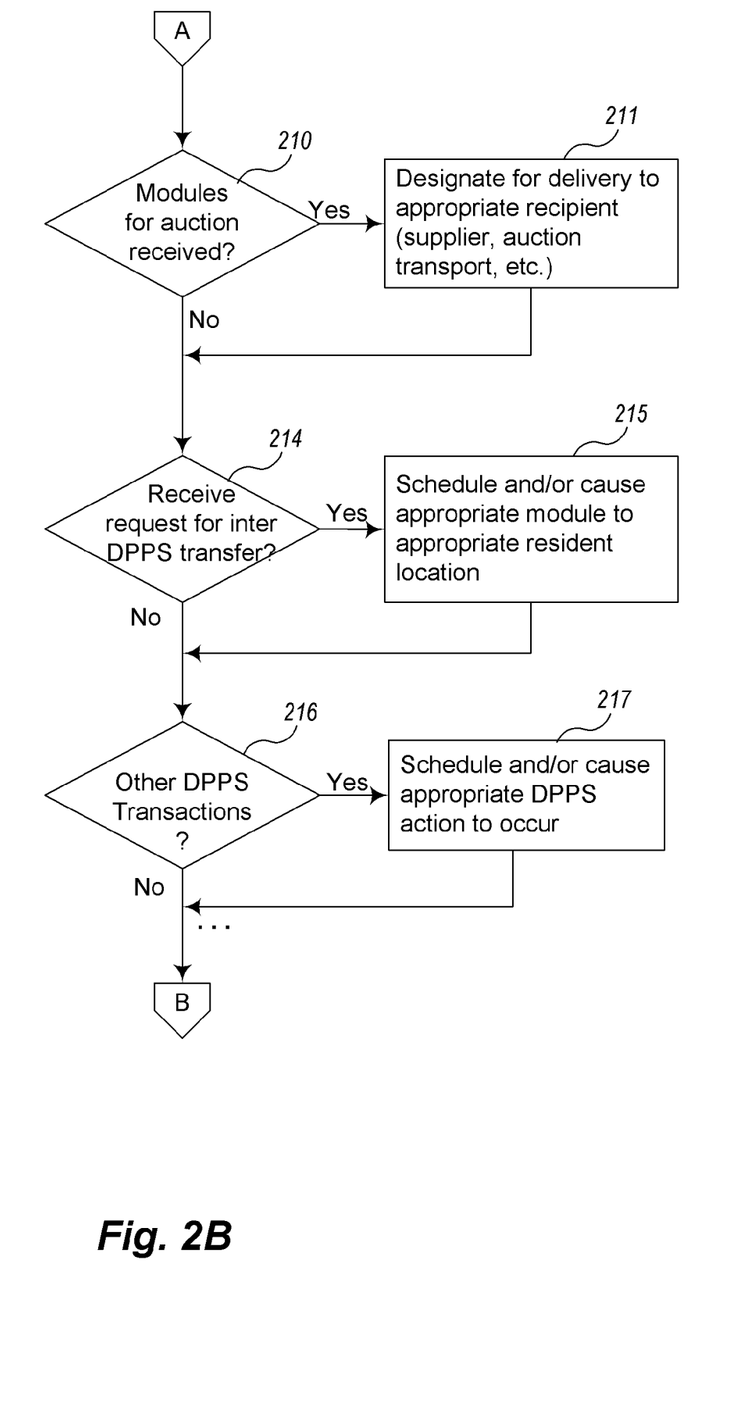

FIGS. 2A and 2B are an example block diagram of an overview of operations of an example DPPS infrastructure in an example DPPS to implement DPPS commerce. For example, the operations and logic illustrated in FIGS. 2A and 2B may be performed by infrastructure 110 of the DPPS 100 illustrated in FIG. 1. In overview, one or more events are processed by logic 112 in the DPPS infrastructure 110 to handle module management and delivery and to effectuate DPPS commerce. The ones shown in FIGS. 2A and 2B provide examples and it is understood that additional capabilities can be suitably incorporated.

For example, blocks 201-217 comprise an event loop that processes events received by a main controller of the DPPS infrastructure. In block 201, the DPPS receives new modules for the various resident locations, for examples from transport vehicles 102a-102b, and stores them as appropriate in local storage area 113. This storage area may be a designated room in a facility such as in the basement of an apartment complex. The modules may be sorted and stored in orders that make sense for automated distribution by a robot, such as by size, intended recipient, supplier, color, or product classification, schedule time for delivery, or by some other characteristic or factor.

In block 202, the DPPS determines whether an event has been triggered that indicates a planned delivery or pickup of a module from a resident location. If not, then the logic continues in block 204. If so, then in block 203 the delivery or pickup of the appropriate module to the indicated resident location is scheduled or caused to be initiated. This may involve invoking other logic that schedules transport robots 111a-111b or other transport mechanisms. The logic then continues in block 204.

In block 204, the DPPS determines whether it has received modules with items to be returned or exchanged. If so, then the DPPS continues in block 205, otherwise continues to process the next event in block 208. In block 205, the DPPS determines whether the exchange can be handled locally. If so, then in block 206, the DPPS can designate a replacement module and schedule or cause it to be delivered in exchange for the one returned. For example, a supplier may have already delivered alternative modules to the DPPS for use in such cases. In some cases, for example, placement of a new product, the supplier may have lots of different configurations, and based upon feedback garnered by the cabinet and passed to the DPPS infrastructure, the DPPS can try another version of the same product or a something that better meets the needs of the potential consumer. The DPPS then continues in block 208.

If the exchange cannot be handled locally as determined in block 205, then the DPPS continues in block 207 to configure the module to be returned to the supplier or to ask for further instructions. For example, in some cases, according to a set of stored or otherwise accessible rules, the DPPS may be able to determine that it should store the module for another recipient, send it to be recycled or discarded (for example, with food), etc. The DPPS then continues in block 208.

In block 208, the DPPS processes the next event which is to determine if servicing has been indicated. This could be caused intrinsically by the system on, for example, a maintenance schedule, or explicitly by a user of the system, be it a consumer or an administrator. If the then the DPPS continues in block 209, otherwise continues in block 210. In block 209, the DPPS schedules and/or causes appropriate servicing of the indicated or appropriate module or component of the DPPS. This may involve dispatching a robot to a resident location to service a cabinet or a module within a cabinet. The DPPS then continues in block 210.

In block 210, the DPPS determines whether it has received modules that are designated to be "auctioned." If so, the DPPS continues in block 211, otherwise continues in block 214. For example, in some deployments, consumers may put items in a module to be put on "Craigslist," "eBay," or other auction marketplace. In such cases the DPPS may receive a designated target marketplace or make the decision based upon any number of criteria, explicit, or implicit. In some scenarios, the DPPS returns the module to a designated transport vehicle which is connected to a third party that handles auction items. In other cases, the DPPS may contain sufficient logic to handle it internally for example, in a local marketplace within the building. In either case, in block 211 the DPPS designates the module for delivery to the appropriate recipient (supplier, auction transport, other resident, etc.) and then continues in block 214.

In block 214, the DPPS determines whether it has received a request for an inter-DPPS transfer. If so the DPPS continues in block 215, otherwise continues in block 216. In some deployments, the DPPS commerce platform may be used to create a secondary marketplace within a budding (such as to buy or trade products) or to play games, such as chess. In block 215, when the DPPS receives such a request, it will handle the request appropriately by scheduling and/or causing the appropriate module to be delivered to the appropriate resident location, and then continue in block 216.

In block 216, the DPPS handles other transactions by, as shown in block 217, scheduling and/or causing the appropriate DPPS action to occur. The DPPS then continues to the beginning of the event loop in block 201.

In some DPPS deployments, different types of additional services may be integrated into the system and take advantage of the DPPS infrastructure, including the robot delivery system. For example, a "robotic" cleaning device could be allocated on a service schedule to clean consumers' apartments. The consumers would be charged accordingly.

Although the techniques of Dynamic Product Presentation System are generally applicable to any type of good, service, or other product, the concepts and techniques described here are applicable to any type of item that can be tried, purchased, rented, or used. For example, in situations where the product may be too large or an incorrect type to be place in a module, information representative of the item may be placed therein. For example, when purchasing a live pet, the pet may not be stored in the module, but pictures, videos, etc. and the opportunity to purchase or rent the pet may still be available. Essentially, the concepts and techniques described are applicable to any commerce environment.

Also, although certain terms are used primarily herein, other terms could be used interchangeably to yield equivalent embodiments and examples. In addition, terms may have alternate spellings which may or may not be explicitly mentioned, and all such variations of terms are intended to be included.

Example embodiments described herein provide applications, tools, data structures and other support to implement a Dynamic Product Presentation System to be used for personal and localized commerce such as the advertisement and placement of new products or upgrades to current products. Other embodiments of the described techniques may be used for other purposes, including for handling medical functions such as diagnostics, for recycling and garbage collection, gaming, and the like. In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the logic, different logic, etc. Thus, the scope of the techniques and/or functions described are not limited by the particular order, selection, or decomposition of aspects described with reference to any particular routine, module, component, and the like.

Figure 3:
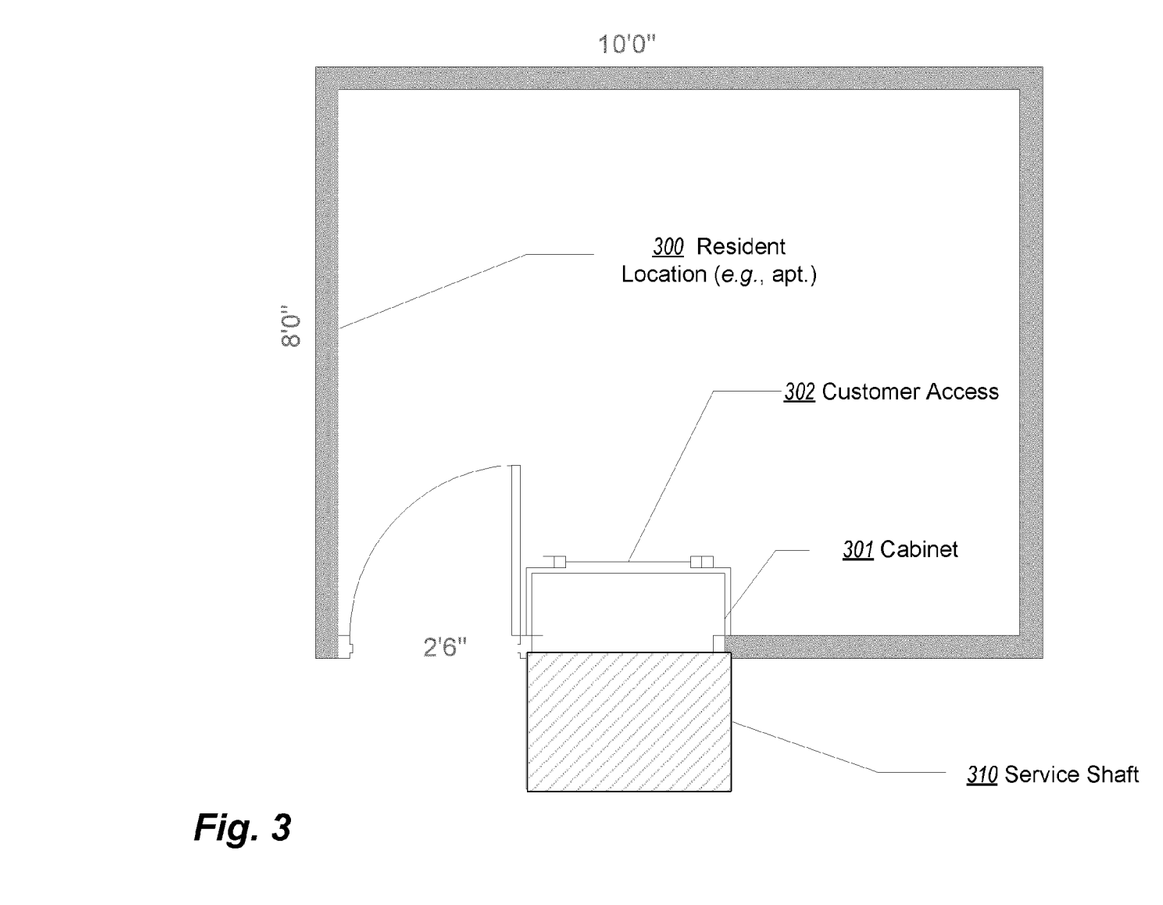
FIG. 3 is a block diagram of a potential consumer resident location that contains an example DPPS commerce cabinet.

FIG. 3 is a block diagram of a potential consumer resident location that contains an example DPPS commerce cabinet. As explained above, the resident location may be in a dwelling, office, hotel, or the like and "resident" is used to refer to the potential consumer or user and does not mean that the person must live or reside there. A resident location 300 is illustrated as an 8 feet by 10 feet single room unit, as might appear in a high density, high rise complex in countries such as China, Singapore, etc. Resident locations may have any number of rooms and in some deployments there are conceivably more than one DPPS commerce cabinet per resident location. Location 300 contains a DPPS commerce cabinet 301, which provides a customer access portal 302 and a service portal (shown here as the entire back of the cabinet). Cabinet 301 may appear to the potential consumer as a closet. A service shaft 310 is illustrated through which transport vehicles such as the robots 111a and 111b in FIG. 1 can gain access to the service portal in the back of cabinet 301.

Figure 4:
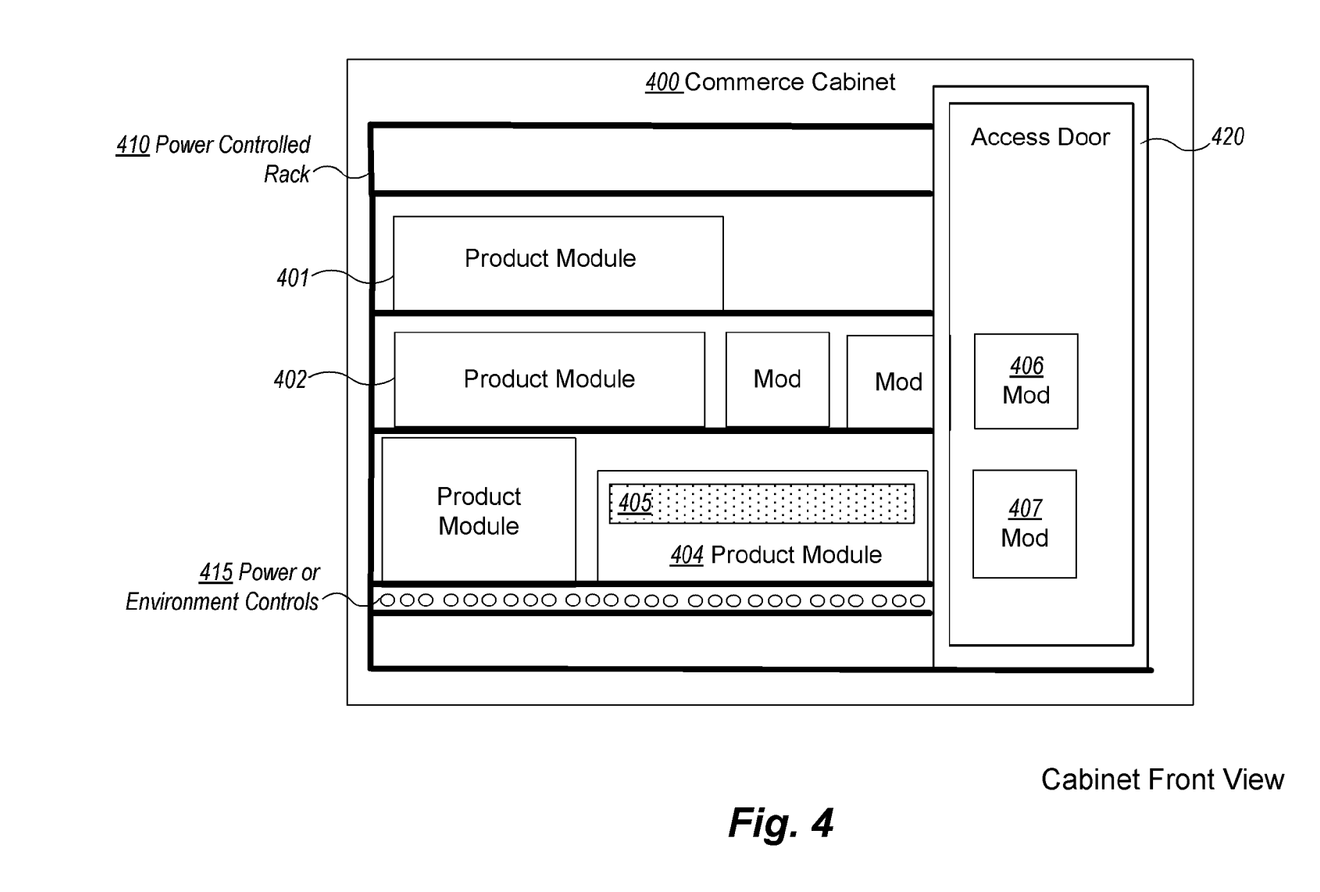
FIG. 4 is a block diagram of a front view of an example DPPS commerce cabinet.

FIG. 4 is a block diagram of a front view of an example DPPS commerce cabinet. Commerce cabinet 400 is, for example, the same as commerce cabinet 301 shown in FIG. 3 and referred to in the other figures. Cabinet 400 contains a modular rack system, illustrated here as rack 410, upon or within which various size modules, such as product modules 401-407 are mounted and can be accommodated. In some example DPPS deployments, the rack 410 has the ability to provide power 415 to modules that are mounted thereon. The power 415 is supplied by the building to the rack 410 and carried throughout the rack as known. In some embodiments, the rack 410 may provide other environmental controls or characteristics to aid the modules in providing controlled environments. The rack 410 is configured such that an automated service vehicle or servicing device (e.g., a robot) can reconfigure and mount modules dynamically.

The modules, for example product modules 401-407 may be different kinds of modules that provide specific environmental conditions to the products that they contain. For example, different sizes and configurations of the modules 401-407 may be arranged on the rack 410. The modules 401-407 may be different sizes based upon the types of items they contain. For example, a module that presents a guitar is likely to be long and thin, while a module that contains beverages may be a cube that is the size of a wine crate. Modules 401-407 may be arranged in many different ways on the rack 410, for example, by default, according to size, by configuration parameters set by the logic that controls the cabinet, in response to configuration rules set up by the consumer or administrator, by logic present in the automated transport vehicles (the robots), according to algorithms that optimize product placement, and/or according to various other arrangement specifications. For example, a resident may wish to specify preferences that place certain modules above a child's height, only accessible at certain times of day, etc. In addition, the modules may be arranged initially, and then later reconfigured based upon various consumer and vendor preferences.

Modules 401-407 may be present in the cabinet 400 in a variety of states. They may be open, closed, empty, full, partially used, and the like. In addition, the modules 401-407 can accommodate a wide variety of products requiring different space and different environments for both presentation and freshness. In addition some products have access restrictions (e.g., over 21 years of age to access) that need to be observed. Thus, different types of modules can be deployed to meet these requirements. For example, modules 401-407 may accommodate the following types of considerations:

Temperature Control.

Some products need cold temperatures (e.g., ice cream) and others need high temperatures (e.g., fresh cooked food);

Humidity Control.

Some products need storage with some humidity (e.g., fresh vegetables) and others need dry environments (e.g., memory sticks, film, etc.);

Tinted or Colored Front.

In some module configurations, a front 405 masks the contents of the module until a user has authenticated. This allows products to be shielded from children or other family members (i.e., possible birthday presents). In some deployments modules are fronted with glass or plastic of different colors to code contents.

Access Control.

It is possible to require access permissions to access one or more of the modules 401-407. Such access permissions could be used for age restricted products, for products which are not child safe, or to prevent certain family members to access particular products. An additional authentication step is required to access the product, which can be a password, time of day, or some other parameter derived from a resident sensor. Access permissions can be implemented by the cabinet logic or by logic that is shipped as part of a "smart" module.

Proxy or Pointer.

In some cases, it may not be practical to display the actual product. Instead of the actual product, a scale model, a small sample, a video or image, or a virtual representation of the product could be presented in the module. For example, instead of the actual product, modules 401-407 could include a scale model of a product too big to fit into the cabinet, a single light bulb which has a short lifetime battery which could be used to check ambiance before ordering a complete set, a video of a pet to adopt, or invitations to attend some outside event.

Medical Functions.

In some deployments, in addition to presenting products, the commerce cabinet 400 may be used for other needs such as for facilitating medical diagnostics. In this case, a biohazard safe container can be used to deliver diagnostic test equipment to the resident. The resident (patient) then performs the test and places the fluids back into the a biohazard safe module for delivery back to the lab.

Inbound/Outbound Services.

An inbound module is defined as presenting a product to the user with the option to try or buy. An outbound module is defined as a module in which the user places an item and signals for that module to be taken away. For example, returning or exchanging a product, recycling or removing garbage, returning fluids for medical diagnostics are examples of outbound modules. Some modules, for example, the medical diagnostic module just described could have both inbound and outbound services.

Gaming/Interactive Modules.

In some deployments, modules 401-407 may include gaming or interactive modules. For example, several residents may play live chess by shipping a chess board back and forth between resident locations. In addition, there may be modules that encourage interaction but that don't deliver a product.

Configurable Appearance Modules.

In some deployments, a module may provide some personalization capability. For example, a user may be able to "color" (for example, using different lighting or filtering) certain modules to reflect their contents.

Other modules with other configurations are similarly able to be incorporated.

The potential consumer accesses the cabinet 400 through access door 420. As shown, access door 420 is transparent (you can see modules 406 and 407) although this may not be the case in all instances. Also, access door 420 is shown as sliding on a track, although other example cabinets may have different types of access doors.

In some DPPS deployments, the cabinets are outfitted with various types of signaling capabilities, some of which may be accessible through the access door 420. For example, there may be lights (e.g., LEDs) to signal when new products have arrived, a touch pad of some nature to allow the consumer to give immediate feedback on the desirable of particular modules or products within them. In addition, other example DPPS deployments may provide auditory signaling and feedback or tactile (haptic) feedback.

Figure 5:
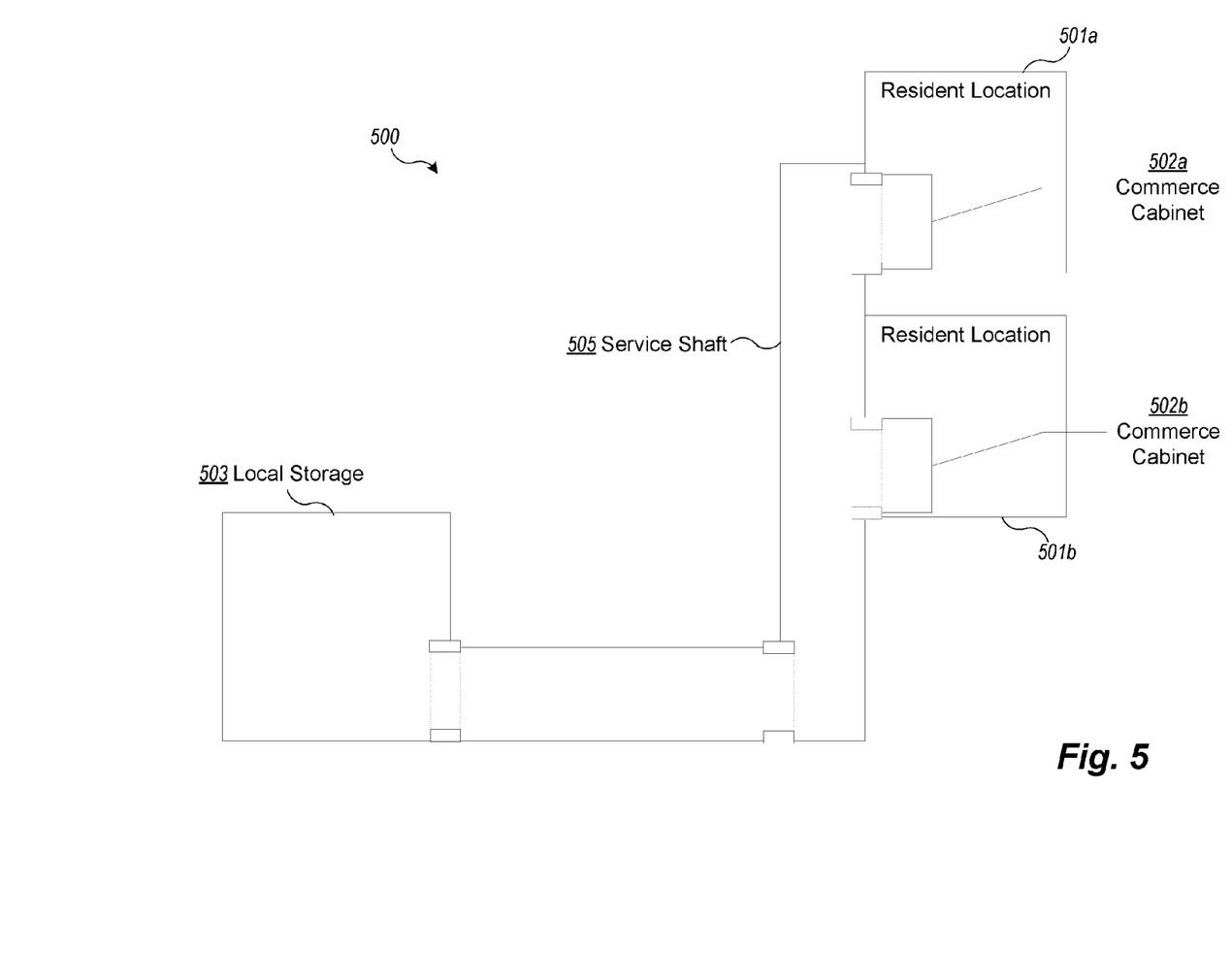
FIG. 5 is a block diagram of an example DPPS deployment inside of an example building with multiple resident locations.

FIG. 5 is a block diagram of an example DPPS deployment inside of an example building with multiple resident locations. The building 500 has been designed and built with the DPPS infrastructure in mind; however, in some cases it may be possible (but difficult) to retrofit a building to contain DPPS infrastructure. Building 500 contains a commerce cabinet in each resident location. For example, commerce cabinet 502*a* is built into resident location 501*a* and commerce cabinet 502*b* is built into resident location 501*b*. There is a service shaft 505 which traverses the building structure sufficient to provide a service device (e.g., a robot) with access to the backend of the commerce cabinets 502*a* and 502*b*. The service shaft 505 connects on the other end to the local storage 503 where the modules to be delivered to resident locations and to be dispatched to other locations are stored.

Service devices such as robots 111*a* and 111*b* travel in the service shaft 505 to service the various commerce cabinets 502*a* and 502*b*. In some embodiments, it is desirable that they never be seen by the potential consumers and that they deliver and exchange modules, potentially place or remove items, and provide other services via the commerce cabinets transparent to the potential consumers.

Figure 6:
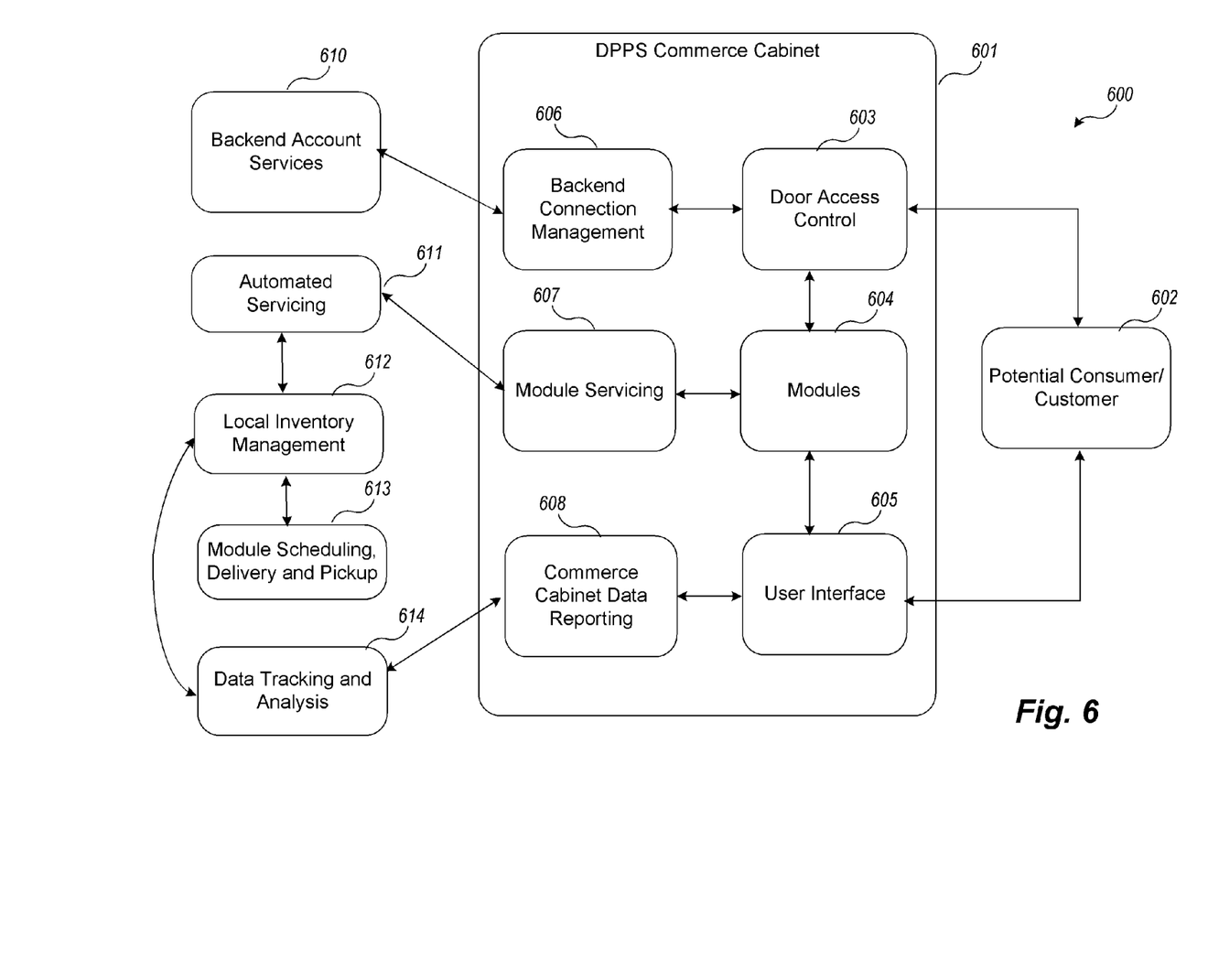
FIG. 6 is a block diagram of function components of a DPPS commerce platform.

FIG. 6 is a block diagram of function components of a DPPS commerce platform. These are examples of some of the functionality available in a typical DPPS deployment. DPPS commerce platform 600 contains components/mechanisms 603-608 (they may be software, hardware, firmware, or some combination) that control the interface of each commerce cabinet 601 to its potential consumer/customer 602, the management of the cabinet 601, and its interface to the DPPS backend—the infrastructure, modules 610-614. In other deployments it is understood that some of the components shown here as part of the DPPS backend (components 610-614) may be differently decomposed, may contain other functions not shown, and may be distributed differently than shown here.

As shown, each commerce cabinet contains logic to implement door access control 603; product module management 604; a user interface 605 for communicating with the consumer 602; backend connection management 606 for communicating with the DPPS backend account services 610 (such as payment arrangements, etc.); a product module servicing function 607 that interfaces with the automated servicing component 611 of the DPPS backend to provide service to the product modules and rack system; and a commerce cabinet data reporting component 608 that works with the data tracking and analysis component 614 and local (building) inventory management component 612 to track and analysis consumer behavior and to optimize product placement in the product modules. As described with reference to FIG. 2, the DPPS infrastructure provides purchasing and account services 610, automated servicing 611, inventory management functions 612, module scheduling, delivery, and pickup (scheduling and dispatch) 613, and the ability to track and analysis user behavior 614. Other functions are also contemplated.

In an example DPPS deployment, the door access control component 603 is responsible for implementing access control as described above. It may implement an open system, or implement restrictions based upon age, time or day, rules set up by the consumer (e.g., parental control rules), and the like.

The product module management component 604 is responsible for managing the product modules inside the cabinet. It contains arrangement logic and possible implements feedback input and dispatch on a product module basis.

The user interface component 605 communicates with the consumer 602 on a variety of topics. In some DPPS deployments the user interface component 605 is ADA compliant. As non-limiting examples, the user interface may implement the following features:

1) a signal for something (item, module, etc.) arriving in the commerce cabinet; the user may be able to set the signal type such as level of sound or appearance, or mute the signal, etc.

2) an indication of transaction type;

3) an interface to give product feedback, which could be for a particular product, product type, module, etc. Feedback might include the following types of feedback:

Yes, I like the product.

No, I don't like the product.

Survey feedback.

Show me more of the same.

Never show me this again.

4) a mechanism to accept a product, transaction type, or license;

5) a way to signal that a module is ready for pickup (return, exchange, etc.) and processing;

6) ability to shutdown the commerce cabinet;

7) ability to set product module location preferences in the rack (e.g., keep toys above one meter);

8) ability to set user preferences;

9) ability to set reminders for expirations (for example, of special deals);

10) way to call for service of cabinet, modules, etc.;

11) help documentation; and 12) ability to set the "look and feel" of the cabinet interface;

In some DPPS deployments the user interface component 605 is ADA compliant.

The commerce cabinet data reporting component 608 potentially provides product suppliers with much more accurate user preference data than that available from tracking on-line shopping transactions. For example, the component 608 in combination with the backend data tracking and analysis component 614 can track the behavior of the shopper before actual trial or buying, actual consumption and usage of a commodity product, product feedback tied to usage and/or order history, consumer preference and selection data Lied to both product presentation, usage history, and the like. In addition, social media and other auxiliary system data may be used to augment the data and analysis. This data also can be analyzed and sold to vendors/suppliers.

One of the main purposes of the DPPS is to improve the placement of products for trial or ongoing consumption. The above functional components 603-613 may be used to offer different types of commerce transactions to potential consumers in line with this purpose, including:

Trial Samples.

Product modules can present a small free sample of a product. For example, a new type of light bulb or a carpet sample can be extracted for viewing before any purchase is made. The product module management component 604 registers the event of the potential consumer pulling the sample out. Better follow-up can be achieved by presenting the full product in a timely fashion.

Timed Trials.

In some scenarios, there is a finite amount of time the consumer can use the product. If the time is exceeded then the consumer's account is automatically debited the product price. The product module management component 604 records the removal event and verifies that the product is actually replaced back in the module before the time expires.

Permanent.

When a product is removed from the product module, the product module management component 604 causes the consumer's account to be debited.

Second Authentication.

For age restricted products a second authorization step is required. The transaction type after authentication could be any of the previous types.

Returns.

The product to be returned could be placed in the product module, appropriately identified, and the vendor/supplier specific return policy applied.

Orders.

The potential consumer orders a product and it is delivered via a module. Payment time is done according to vendor/supplier policy.

Auction Marketplace (Craigslist) Function.

The item the consumer wishes to deliver to a buyer is placed into a module for delivery.

Gaming.

The recipient can play a game and place the game in a product module with instructions as to a target location.

Inter-Building DPPS Commerce.

Residents of the same budding can sell products to each other via the DPPS. This could be widened to other DPPS locations with the addition of a delivery service.

Other types of commercial transactions may be similarly incorporated.

Figure 7:
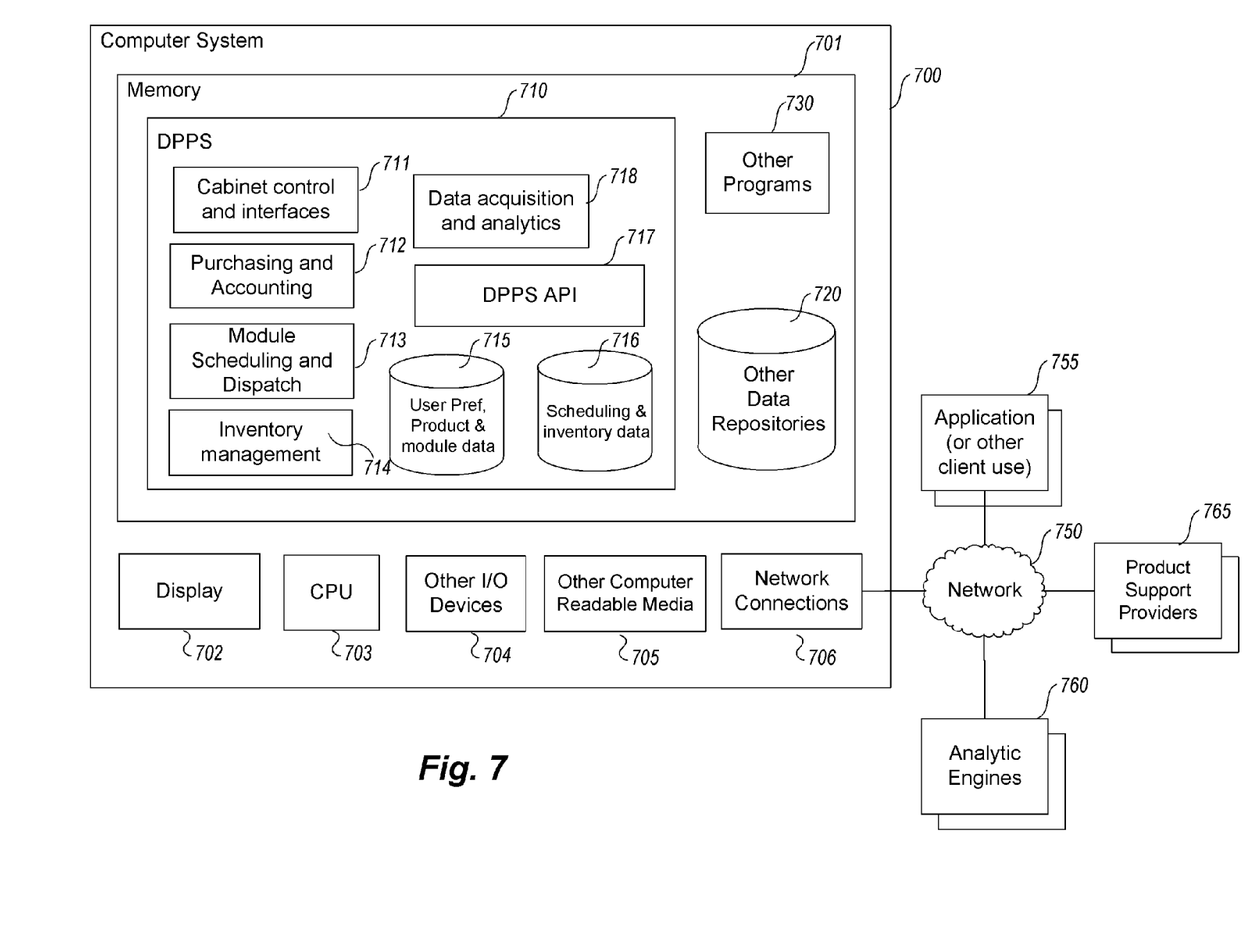
FIG. 7 is an example block diagram of a computing system for practicing embodiments of software and other logic modules of a DPPS.

The DPPS logic and code described above may be implemented on one or more computing systems separate from or embedded into the cabinet and DPPS infrastructure. FIG. 7 is an example block diagram of a computing system for practicing the software and other logic modules of a DPPS described.

Note that one or more general purpose virtual or physical computing systems suitably instructed or a special purpose computing system may be used to implement the DPPS. Further, the DPPS components may be implemented in software, hardware, firmware, or in some combination to achieve the capabilities described herein.

The computing system 700 may comprise one or more server and/or client computing systems and may span distributed locations. In addition, each block shown may represent one or more such blocks as appropriate to a specific embodiment or may be combined with other blocks. Moreover, the various blocks of the DPPS 710 may physically reside on one or more machines, which use standard (e.g., TCP/IP) or proprietary interprocess communication mechanisms to communicate with each other.

In the embodiment shown, computer system 700 comprises a computer memory ("memory") 701, a display 702, one or more Central Processing Units ("CPU") 703, Input/Output devices 704 (e.g., keyboard, mouse, CRT or LCD display, etc.), other computer-readable media 705, and one or more network connections 706. The DPPS 710 is shown residing in memory 701. In other embodiments, some portion of the contents, some of, or all of the components of the DPPS 710 may be stored on and/or transmitted over the other computer-readable media 705. The components of the DPPS 710 preferably execute on one or more CPUs 703 and manage the placement, exchange, and delivery of personalized products, as described herein. Other code or programs 730 and potentially other data repositories, such as data repository 706, also reside in the memory 701, and preferably execute on one or more CPUs 703. Of note, one or more of the components in FIG. 7 may not be present in any specific implementation. For example, some embodiments embedded in other software may not provide means for user input or display.

In a typical embodiment, the DPPS 710 includes one or more cabinets control and interface components 711, one or more purchasing and accounting components 712, a module scheduling and dispatch component 713, an inventory management component 714, and one or more data acquisition and analytic components 718. In at least some embodiments, the data analytics are provided external to the DPPS and is available, potentially, over one or more networks 750. Other and/or different modules may be implemented. In addition, the DPPS may interact via a network 750 with application or client code 755 that, for example, uses results computed by the DPPS 710, analytics and marketing engines 760, and/or one or more product support provider systems 765. Also, of note, the user preference, product, and module data repository 715 may be provided external to the DPPS as well, for example in a knowledge base accessible over one or more networks 750.

In an example embodiment, components/modules of the DPPS 710 are implemented using standard programming techniques. For example, the DPPS 710 may be implemented as a "native" executable running on the CPU 103, along with one or more static or dynamic libraries. In other embodiments, the DPPS 710 may be implemented as instructions processed by a virtual machine. In general, a range of programming languages known in the art may be employed for implementing such example embodiments, including representative implementations of various programming language paradigms, including but not limited to, object-oriented, functional, procedural, scripting, and declarative programming.

The embodiments described above may also use well-known or proprietary, synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously and communicate using message passing techniques. Equivalent synchronous embodiments are also supported. Also, other functions could be implemented and/or performed by each component/module, and in different orders, and in different components/modules, yet still achieve the described functions.

In addition, programming interfaces to the data stored as part of the DPPS 710 (e.g., in the data repositories 715 and 716) can be available by standard mechanisms such as through C, C++, C#, and Java APIs; libraries for accessing files, databases, or other data repositories; through scripting languages such as XML; or through Web servers, FTP servers, or other types of servers providing access to stored data. The data repositories 715 and 716 may be implemented as one or more database systems, file systems, or any other technique for storing such information, or any combination of the above, including implementations using distributed computing techniques.

Also the example DPPS 710 may be implemented in a distributed environment comprising multiple, even heterogeneous, computer systems and networks. Different configurations and locations of programs and data are contemplated for use with techniques of described herein. In addition, the DPPS may be physical or virtual computing systems and may reside on the same physical system. Also, one or more of the modules may themselves be distributed, pooled or otherwise grouped, such as for load balancing, reliability or security reasons. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.) and the like. Other variations are possible. Also, other functionality could be provided by each component/module, or existing functionality could be distributed amongst the components/modules in different ways, yet still achieve the functions of an DPPS.

Furthermore, in some embodiments, some or all of the components of the DPPS 710 may be implemented or provided in other manners, such as at least partially in firmware and/or hardware, including, but not limited to one or more application-specific integrated circuits (ASICs), standard integrated circuits, controllers executing appropriate instructions, and including microcontrollers and/or embedded controllers, field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., a hard disk; memory; network; other computer-readable medium; or other portable media article to be read by an appropriate drive or via an appropriate connection, such as a DVD or flash memory device) to enable the computer-readable medium to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 61/823,256, entitled "DYNAMIC PRODUCT PRESENTATION SYSTEM AND COMMERCE PLATFORM," filed May 14, 2013, is incorporated herein by reference, in its entirety.

From the foregoing it will be appreciated that, although specific embodiments have been described herein for purposes of illustration, various modifications may be made without deviating from the spirit and scope of the invention. For example; the methods and systems for performing product placement and analysis discussed herein are applicable to other architectures other than the architecture described herein. Also, the methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A personalized commerce system for providing automated product placement in a residential building structure having a plurality of residential locations, each residential location configured to be populated by at least one human, comprising:

a plurality of commerce cabinets, each cabinet built into a residential location of the plurality of residential locations within the residential building structure, each residential location associated with a potential human consumer residing in or occupying the residential location, each cabinet having a modular rack system that is configured to receive and store one or more physical modules of standardized sizes, the physical modules mountable within the modular rack system by a non-human service device, each physical module configured to contain a plurality of products or representations of products, each cabinet comprising a reporting component that receives and tracks feedback from a potential human consumer of a commerce cabinet regarding one or more products or representations of products stored in or retrieved from the one or more physical modules stored within the commerce cabinet; and a backend infrastructure built into the residential building structure comprising:

a service channel configured to provide access to the plurality of commerce cabinets by non-human service devices; and one or more non-human service devices, each non-human service device configured to travel within the service channel built into the residential building structure to access the plurality of commerce cabinets to transport physical modules to and from the plurality of commerce cabinets to transport products or representations of products within the physical modules, wherein the products or representations of products are provided to the associated potential human customer without the associated potential human customer traveling to a location remote from the residential location of the associated potential human customer to obtain the products or representations of products placed in the physical modules;

a feedback component that receives feedback from the reporting component of one or more of the plurality of commerce cabinets and adjusts the products or representations of products based upon the received feedback; and wherein the one or more non-human service devices automatically arranges the products or representations of products that have been adjusted and wherein the backend infrastructure sends a signal to one or more of the plurality of commerce cabinets alerting a potential human consumer that an item or a module has changed.

2. The system of claim 1 wherein the backend infrastructure further comprises:
a local warehouse connected to the service channel of the backend infrastructure configured to store a plurality of physical modules that each contain one or more products or representations of products, each physical module provided by a supplier or vendor, wherein the one or more non-human service devices transport physical modules between the one or more of the plurality of commerce cabinets and the local warehouse.

3. The system of claim 2 wherein the plurality of physical modules that are stored in the local warehouse are packed by the supplier or vendor before storage in the local warehouse.

4. The system of claim 2 wherein plurality of physical modules that are stored in the local warehouse are delivered on behalf of the supplier before storage in the local warehouse.

5. The system of claim 1 wherein a modular rack system in each commerce cabinet is configured to receive and store one or more physical modules of different sizes that are mountable within the modular rack system in a tessellated fashion.

6. The system of claim 1 wherein each commerce cabinet is configured with at least a portion of one side accessible to the associated potential human consumer and a second side, in opposition to the one side, accessible to one of the one or more non-human service devices traveling on the service channel.

7. The system of claim 1 wherein at least some of the one or more physical modules provide environmental control to the contained one or more products.

8. The system of claim 1 wherein the modular rack system in each cabinet provides power to physical modules that require power to drive environmental control of the physical module.

9. The system of claim 1 wherein at least one of the commerce cabinets is configured to store both a physical module that contains a product requiring hot temperatures at the same time as a physical module that contains a product requiring cold temperatures.

10. The system of claim 1 wherein a physical module is configured to contain a representation of a product when the product does not fit or is otherwise unsuitable to be contained in a physical module that is storable in a commerce cabinet.

11. The system of claim 1 the backend infrastructure further comprising:
a purchasing component that permits the potential human consumer of a commerce cabinet to purchase one or more products from one or more physical modules stored within the commerce cabinet.

12. The system of claim 11 wherein the purchasing backend allows the potential human consumer to remove the one or more products for trial before purchase.

13. The system of claim 1 wherein the feedback component further comprises:
a tracking and analysis component that tracks behavior of a potential human consumer of a commerce cabinet before actual trial or buying, tracks actual consumption or usage of a product, or tracks consumer preference and selection data tied to product presentation.

14. The system of claim 1 wherein the physical modules are used to deliver a test product.

15. The system of claim 1 wherein the one or more non-human service devices comprise one or more automated robots.

16. The system of claim 1 wherein a non-human service device that accesses a commerce cabinet is configured to automatically arrange the one or more physical modules stored within the commerce cabinet.

17. The system of claim 16 wherein the non-human service device that accesses a commerce cabinet is configured to automatically arrange the one or more physical modules stored within the commerce cabinet to place a physical module in a location not accessible to a particular person, class of person, or age of person.

18. The system of claim 1 wherein each commerce cabinet has a user interface to permit the associated potential human consumer to engage in a commercial transaction.

19. A method in a computing system configured to control the one or more non-human service devices to transport physical modules to and from the one or more of the plurality of commerce cabinets according to claim 1.

20. A computer readable medium containing instructions to control a computer processor to control the one or more non-human service devices to transport physical modules to and from the one or more of the plurality of commerce cabinets according to claim 1.

* * * * *